United States Patent
Pufall

(10) Patent No.: US 6,241,314 B1
(45) Date of Patent: Jun. 5, 2001

(54) SWIVELING CAR SEAT

(76) Inventor: Kevin Jon Pufall, 126 St. Sabre Dr., Swansea, IL (US) 62226

( * ) Notice: Subject to any disclaimer, the term of this patent is extended or adjusted under 35 U.S.C. 154(b) by 0 days.

(21) Appl. No.: 09/484,513

(22) Filed: Jan. 18, 2000

Related U.S. Application Data

(63) Continuation-in-part of application No. 09/246,336, filed on Feb. 9, 1999, now abandoned, and a continuation-in-part of application No. 09/247,639, filed on Feb. 10, 1999, now abandoned.

(51) Int. Cl.⁷ .................................................. A47C 1/08
(52) U.S. Cl. .............................. 297/256.12; 297/256.16
(58) Field of Search ........................ 297/256.12, 256.1, 297/250.1, 344.22, 344.21, 256.16, 440.1; 248/425

(56) References Cited

U.S. PATENT DOCUMENTS

| | | |
|---|---|---|
| 2,154,600 * | 4/1939 | Bell . |
| 2,372,495 * | 3/1945 | Horner et al. . |
| 4,155,593 * | 5/1979 | Swenson et al. . |
| 4,762,364 * | 8/1988 | Young . |
| 4,936,629 * | 6/1990 | Young . |
| 5,487,705 * | 1/1996 | Clarke . |
| 5,524,964 * | 6/1996 | Weimersheimer . |

* cited by examiner

Primary Examiner—Milton Nelson, Jr.
(74) Attorney, Agent, or Firm—Armstrong Teasdale LLP

(57) ABSTRACT

A car seat assembly includes a support member including a first curved slot intersecting a second curved slot. The assembly further includes a pivot member including a first pin and a second pin. The first pin is positioned within the first slot and the second pin is positioned within the second slot. The assembly also includes a seat member connected to the pivot member such that the seat member pivots with respect to the support member.

17 Claims, 5 Drawing Sheets

SWIVELING CAR SEAT

CROSS REFERENCE TO RELATED APPLICATIONS

This application is a continuation-in-part of U.S. patent application Ser. No. 09/246,336; filed Feb. 9, 1999, and a continuation-in-part of U.S. patent application Ser. No. 09/247,639; filed Feb. 10, 1999, both now abandoned.

BACKGROUND OF THE INVENTION

This invention relates generally to car seats, and more particularly to car seats that swivel.

It is well known to place children in a car seat when traveling in a vehicle, such as an automobile. The children car seat provides a safe traveling environment for the child. However, it is sometimes difficult to place the child in the car seat, for various reasons, such as the mood of the child, the height of the vehicle, and the size of the person placing the child in the seat.

Some known car seats can be removed from the vehicle with the child still secured within the seat. In addition, these child car seats can be attached to a car seat while the child is secured within the seat. Unfortunately, these seats can also be difficult to place within the car due to various reasons, such as how crowded the inside of the vehicle is, the height of the vehicle, and the size of the person placing the child in the seat.

BRIEF SUMMARY OF THE INVENTION

In an exemplary embodiment of the invention, a child car seat assembly includes a seat member connected to a pivot member such that the seat member pivots in relation to the automobile in which it is placed.

More particularly, the child car seat assembly includes a support member including a first curved slot and a second curved slot. The first curved slot intersects the second curved slot. In addition, the car seat assembly includes a pivot member including a first tab and a second tab. The first tab is positioned within the first slot and the second tab is positioned within the second slot. The car seat assembly further includes a seat member connected to the pivot member.

The child car seat assembly allows a person to easily place a child in the car seat. The seat pivots to allow the person to situate the child in the seat. The seat is then pivoted so that the child is facing either forward or backward and then secured in place.

DETAILED DESCRIPTION OF THE INVENTION

Figure 1:
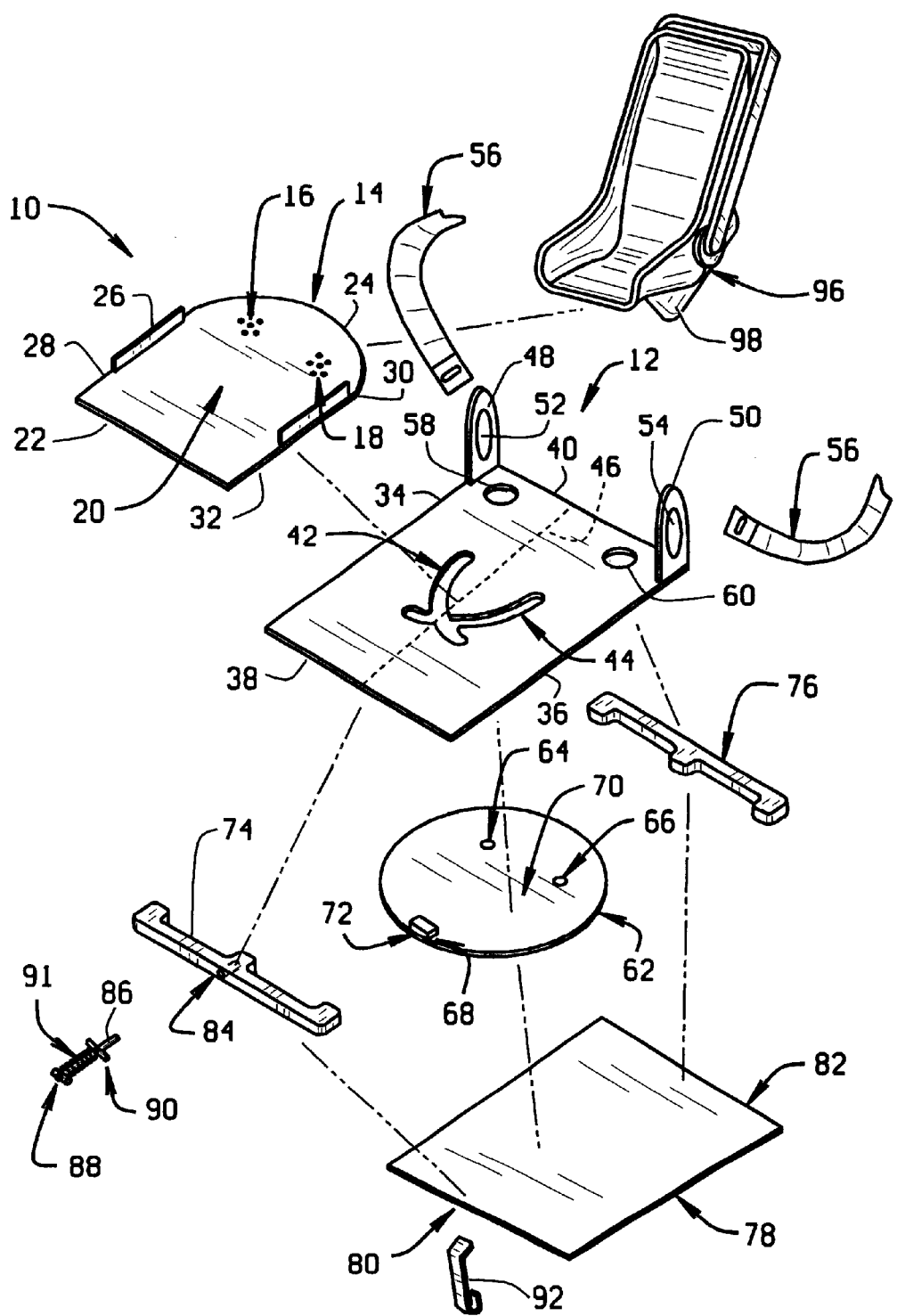
FIG. 1 is an exploded view of a car seat assembly in accordance with one embodiment of the invention.

FIG. 1 illustrates a car seat assembly 10 including a support member 12 and a pivot member 14. Pivot member 14 includes a first pin 16 and a second pin 18. Pins 16 and 18 extend from a bottom surface 20 of pivot member 14. Pivot member 14 includes a substantially straight front side 22 and a rounded back side 24. Pins 16 and 18 are positioned closer to back side 24 than to front side 22. Pivot member 14 also includes a first flange 26 extending from a first side 28 and a second flange 30 extending from a second side 32. Flanges 26 and 30 extend partially along first side 28 and second side 32, respectively.

Support member 12 includes a first side 34, a second side 36, a front 38, and a back 40. In addition, support member 12 includes a first slot 42 and a second slot 44. Slot 42 is curved and extends forward and towards second side 36 and slot 44 is curved and extends forward and towards first side 34. Slots 42 and 44 intersect along a center line 46 of support member 12. Slots 42 and 44 are sized to receive pins 16 and 18, respectively, such that pins 16 and 18 are in sliding relation with support member 12.

Support member 12 also includes a first retaining portion 48 and a second retaining portion 50. First retaining portion 48 extends from a back of first side 34 and includes an opening 52 therethrough. Second retaining portion 50 extends from a back of second side 36 and includes an opening 54 therethrough. Openings 52 and 54 are sized to receive a seat belt 56. Retaining portions 48 and 50 are rigid and unitary with respect to support member 12. In an alternative embodiment, retaining portions 48 and 50 are attached to support member 12 with heat, chemical, or mechanical fasteners as is well known in the art.

Support member 12 also includes a first opening 58 and a second opening 60. Openings 58 and 60 are sized to receive a rigid seat bracket (not shown), such as a seat bracket that attached to an automobile seat (not shown).

Seat assembly 10 also includes a substantially circular attachment disk 62. Disk 62 includes a first opening 64 extending therethrough and a second opening 66 extending therethrough. Openings 64 and 66 are sized to receive pins 16 and 18, respectively, and pivot member 14 is connected to attachment disk 62 by pins 16 and 18. In one embodiment, pins 16 and 18 are hollow and a bolt (not shown) extends through each pin 16 and 18. Each bolt secures one of pins 16 and 18 to attachment disk 62. In an alternative embodiment, openings 64 and 66 extend only partially through disk 62.

Attachment disk 62 also includes a locking tab 68 extending from a top surface 70 and unitary with disk 62. Locking tab 68 includes an opening 72 that extends partially therethrough. In an alternative embodiment, opening 72 extends fully through locking tab 68.

Seat assembly 10 further includes a first spacer 74, a second spacer 76, and a base 78. First spacer 74 extends between support member front 38 and a front 80 of base 78. Second spacer 76 extends between support member back 40 and a back 82 of base 78. Spacers 74 and 76 are fixedly attached to support member 12 and base 78 with heat, a glue, or an epoxy, as is well known in the art. In an alternative embodiment, spacers 74 and 76 are fixedly attached to support member 12 and base 78 with mechanical fasteners, such as bolts or pins. First spacer 74 includes an opening 84 extending therethrough. Seat assembly 10 also includes a locking pin 86 including a handle 88, a flange 90, and a spring 91. Spring 91 extends around pin 86 between handle 88 and flange 90. Pin 86 extends through opening 84 into opening 72 until flange 90 contacts attachment disk locking tab 68.

A strap 92 is positioned between base 78 and spacer 74. Strap 92 is attached to base 78 by a bolt (not shown) that extends through base 78, strap 92, spacer 74, and support member 12. In an alternative embodiment, strap 92 is fixedly attached to base 78 and spacer 74 with heat, epoxy, or a glue, as is well known in the art.

Seat assembly 10 further includes a seat member 96 attached to pivot member 14 by a plurality of bolts (not shown). In one embodiment, seat member 96 is attached to pivot member 14 by four bolts. Two of the bolts extend through a pair of openings (not shown) within flange 26 and through a pair of openings (not shown) within a first leg 98 of seat member 96. The other two bolts extend through a pair of openings (not shown) within flange 30 and a pair of openings (not shown) within a second leg (not shown) of seat member 94. A nut (not shown) is then fastened to each bolt to secure seat member 96 to pivot member 14. In an alternative embodiment, seat member 96 is detachably connected to pivot member 14 as is well known in the art.

Figure 2:
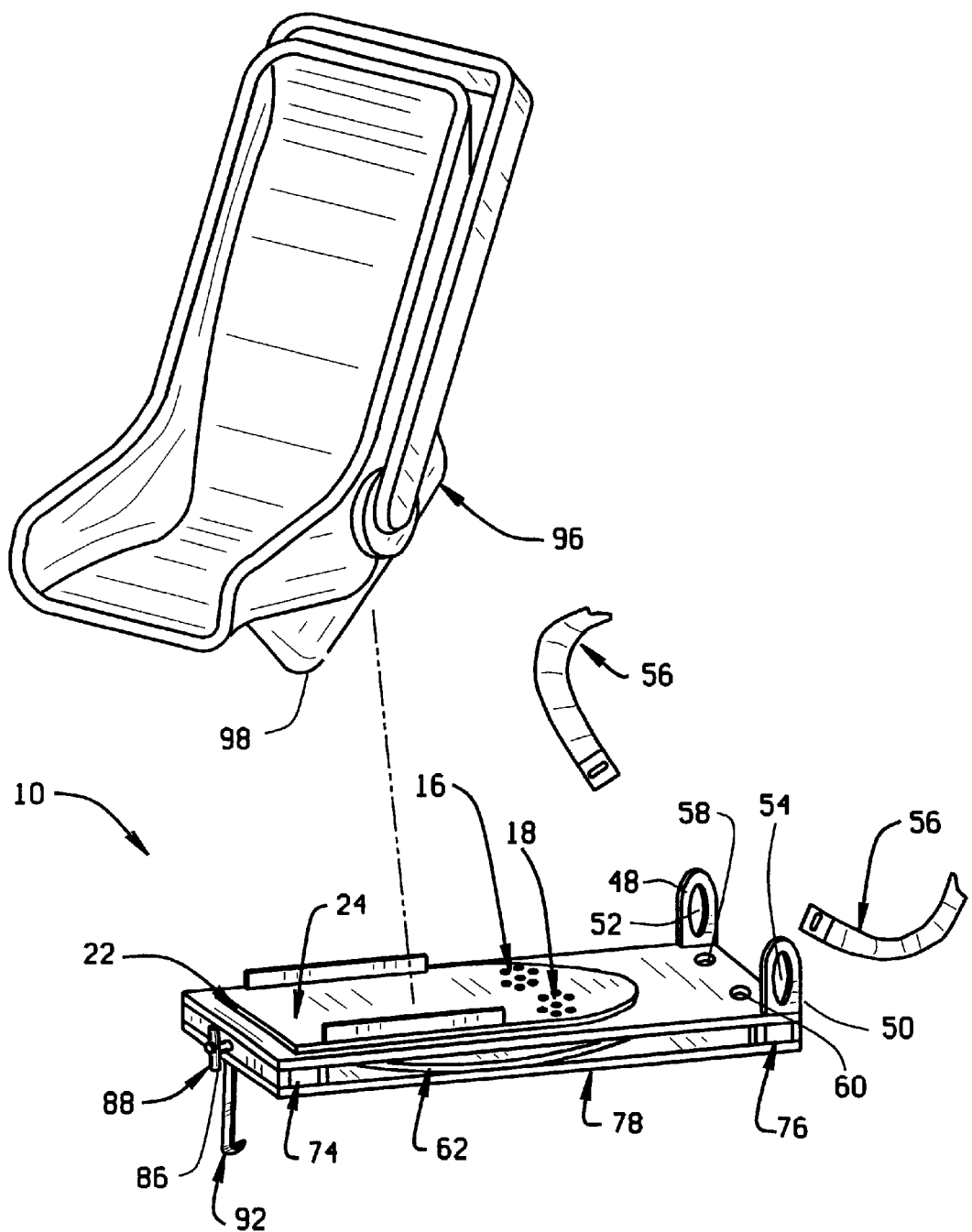
FIG. 2 is a partially exploded side view of the car seat assembly shown in FIG. 1.

FIG. 2 is a partially exploded side view of car seat assembly 10. Pivot member 14 is attached to attachment disk 62 with pins 16 and 18. Attachment disk 62 is positioned between support member 12 and base 78 such that attachment disk 62 can rotate with respect to support member 12 and base 78. A first air gap extends between attachment disk 62 and support member 12 and a second air gap extends between attachment disk 62 and base 78. The spacing of attachment disk 62 between support member 12 and base 78 is maintained by first spacer 74 and second spacer 76 since a thickness of first spacer 74 and second spacer 76 is greater than a thickness of attachment disk 78. In one embodiment, the thickness of first spacer 74 and second spacer 76 is identical. In an alternative embodiment, the thickness of first spacer 74 is greater or less than the thickness of second spacer 76.

Pins 16 and 18 extend through slots 42 and 44 such that pivot member 14 can pivot, or rotate, with respect to support member 12. In one embodiment, pivot member 14 can pivot about 180 degrees with respect to support member 12, i.e., such that front side 22 can be substantially parallel to either support member first side 34 or support member second side 36.

In use, car seat assembly 10 is positioned in an automobile (not shown) and seat belt 56 is fastened through seat belt retaining portions 48 and 50. Pin 86 is then pulled out of locking tab opening 72 until flange 90 contacts first spacer 74. Pivot member 14 along with seat member 96 is then pivoted towards first side 34 of support member 12. In an alternative embodiment, pivot member 14 along with seat member 96 is pivoted towards second side 34 of support member 12. A child (not shown) is then secured within seat member 96 as is well known in the art. After the child is secured within seat member 96, pivot member 14 and seat member 96 are pivoted such that pivot member front side 22 is aligned with support member front 38. Then, pin 86 is positioned adjacent locking tab opening 72 and spring 91 forces pin 86 within opening 72 to prevent pivot member 14 and seat member 96 from pivoting with respect to base 78.

Figure 3:
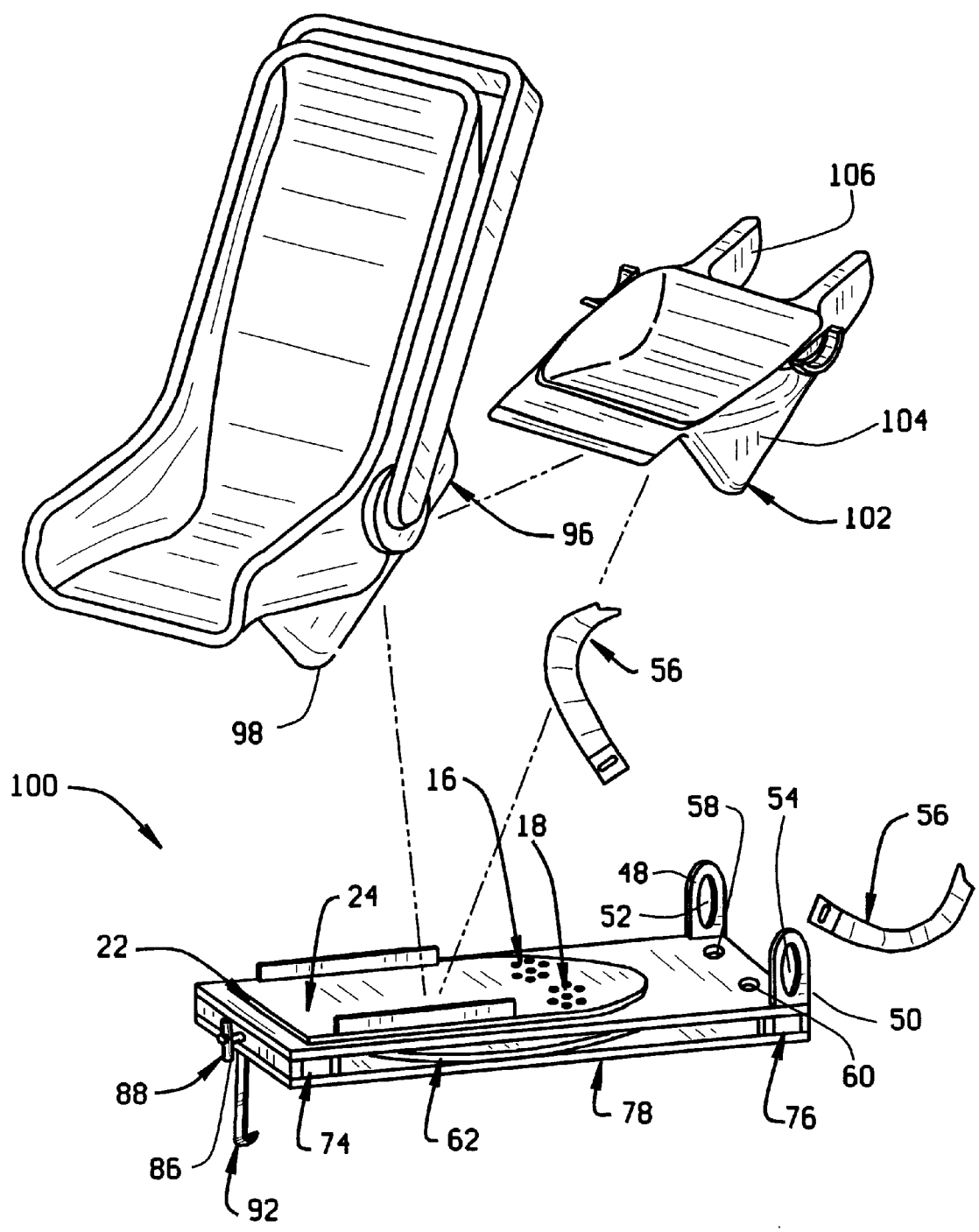
FIG. 3 is a partially exploded side view of a car seat assembly in accordance with an alternative embodiment of the invention.

FIG. 3 illustrates an alternative car seat assembly 110. Car seat assembly 110 is identical to car seat assembly 10 described above, except that car seat assembly 110 includes a seat holder 102 that connects seat member 96 to pivot member 14. Seat holder 102 is attached to pivot member 14 by a plurality of bolts (not shown).

In one embodiment, seat holder 102 is attached to pivot member 14 by four bolts. Two of the bolts extend through a pair of openings (not shown) within flange 26 and through a pair of openings (not shown) within a first leg 104 of seat holder 102. The other two bolts extend through a pair of openings (not shown) within flange 30 and a pair of openings (not shown) within a second leg 106 of seat holder 102. A nut (not shown) is then fastened to each bolt to secure seat holder 102 to pivot member 14. Seat member 96 is connected to seat holder 102 as is well known in the art.

In one embodiment, car seat assembly 100 is an infant car seat assembly, and seat member 96 is configured to secure an infant.

Figure 4:
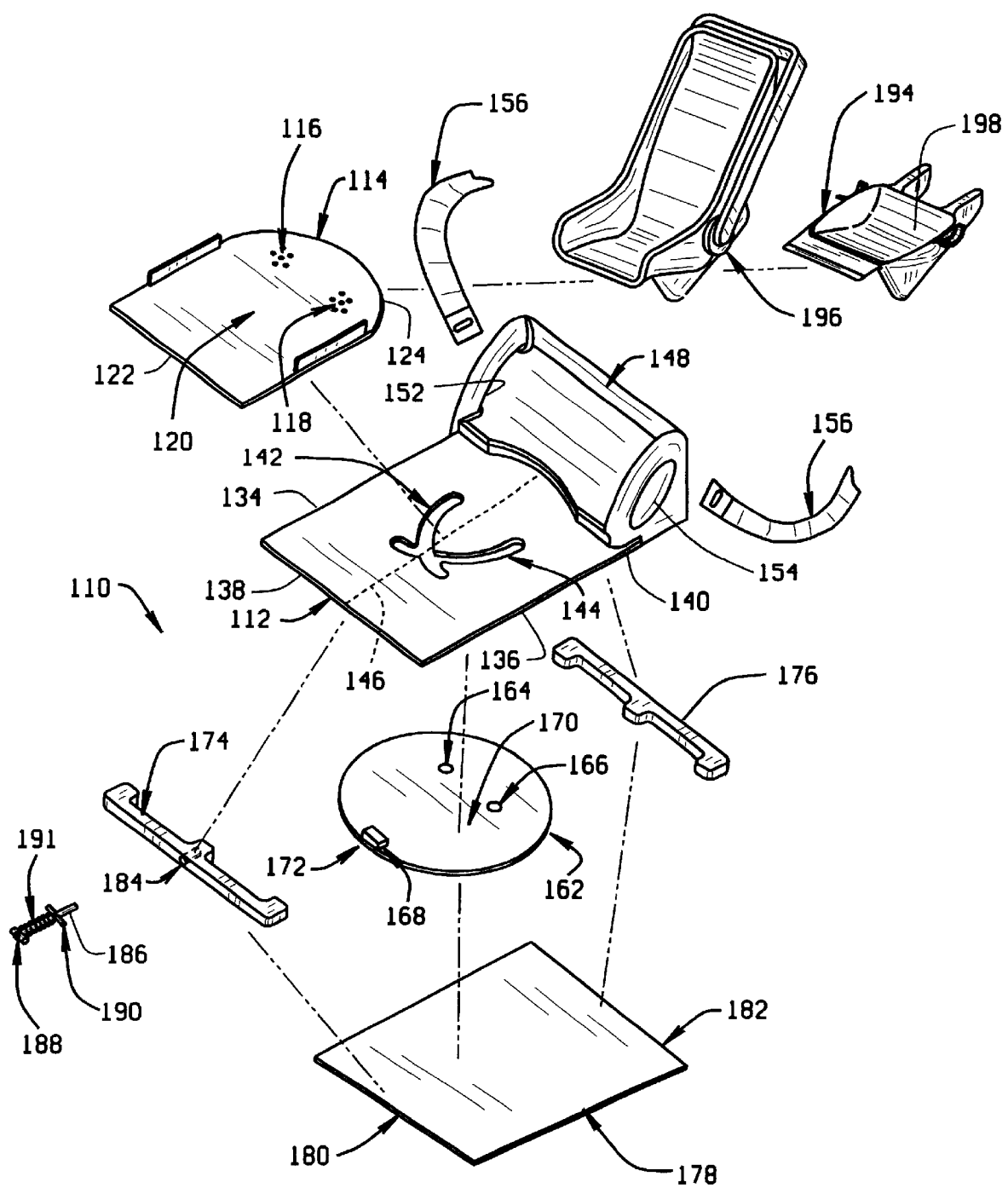
FIG. 4 is an exploded view of a car seat assembly in accordance with a further alternative embodiment of the invention.

FIG. 4 illustrates an alternative car seat assembly 110 including a support member 112 and a pivot member 114. Pivot member 114 includes a first pin 116 and a second pin 118. Pins 116 and 118 extend from a bottom surface 120 of pivot member 114. Pivot member 114 includes a substantially rectangular front portion 122 and a substantially rounded back portion 124. Pins 116 and 118 are positioned within back portion 124.

Support member 112 includes a first side 134, a second side 136, a front 138, and a back 140. In addition, support member 112 includes a first slot 142 and a second slot 144. Slot 142 is curved and extends forward and towards second side 136, and slot 144 is curved and extends forward and towards first side 134. Slots 142 and 144 intersect along a center line 146 of support member 112. Slots 142 and 144 are sized to receive pins 116 and 118, respectively such that pins 116 and 118 are in sliding relation with support member 112.

Support member 112 also includes a retaining portion 148 extending from back 140 and including a first opening 152 and a second opening 154. Openings 152 and 154 are sized to receive a seat belt 156. Retaining portion 148 is rigid and unitary with support member 112. In an alternative embodiment, retaining portion 148 is attached to support member 112 with heat, chemical, or mechanical fasteners as is well known in the art.

Seat assembly 110 also includes a substantially circular attachment disk 162. Disk 162 includes a first opening 164 extending partially therethrough and a second opening 166 extending partially therethrough. Openings 164 and 166 are sized to receive pins 116 and 118, respectively, and pivot member 114 is connected to attachment disk 162 by pins 116 and 118. In one embodiment, openings 164 and 166 extend through disk 162 and pins 116 and 118 are hollow. A bolt (not shown) extends through each pin 116 and 118. Each bolt secures one of pins 116 and 118 to attachment disk 162.

Attachment disk 162 also includes a locking tab 168 extending from a top surface 170 of, and unitary with, disk 162. Locking tab 168 includes an opening 172 that extends partially therethrough. In an alternative embodiment, opening 172 extends fully through locking tab 168.

Seat assembly 110 further includes a first spacer 174, a second spacer 176, and a base 178. First spacer 174 extends between support member front 138 and a front 180 of base 178. Second spacer 176 extends between support member back 140 and a back 182 of base 178. Spacers 174 and 176 are fixedly attached to support member 112 and base 178 with heat, a glue, or an epoxy, as is well known in the art. In an alternative embodiment, spacers 174 and 176 are fixedly attached to support member 112 and base 178 with mechanical fasteners such as bolts or pins. First spacer 174 includes an opening 184 extending therethrough. Seat assembly 110 also includes a locking pin 186 including a handle 188, a flange 190, and a spring 191. Spring 191 extends around pin 186 between handle 188 and flange 190. Pin 186 extends through opening 184 into opening 172 until flange 190 contacts attachment disk locking tab 168.

Seat assembly 110 further includes a seat holder 194 attached to pivot member 114 and a seat member 196 attached to seat holder 194. Seat holder 194 is attached to pivot member 114 by a plurality of bolts (not shown). In one embodiment, seat holder 194 is attached to pivot member 114 by four bolts. The bolts extend through openings (not shown) within pivot member 114 and through openings (not shown) within a bottom 198 of seat holder 194. A nut (not shown) is then fastened to each bolt to secure seat holder 194 to pivot member 114. Seat member 196 is connected to seat holder 194 as is well known in the art.

Figure 5:
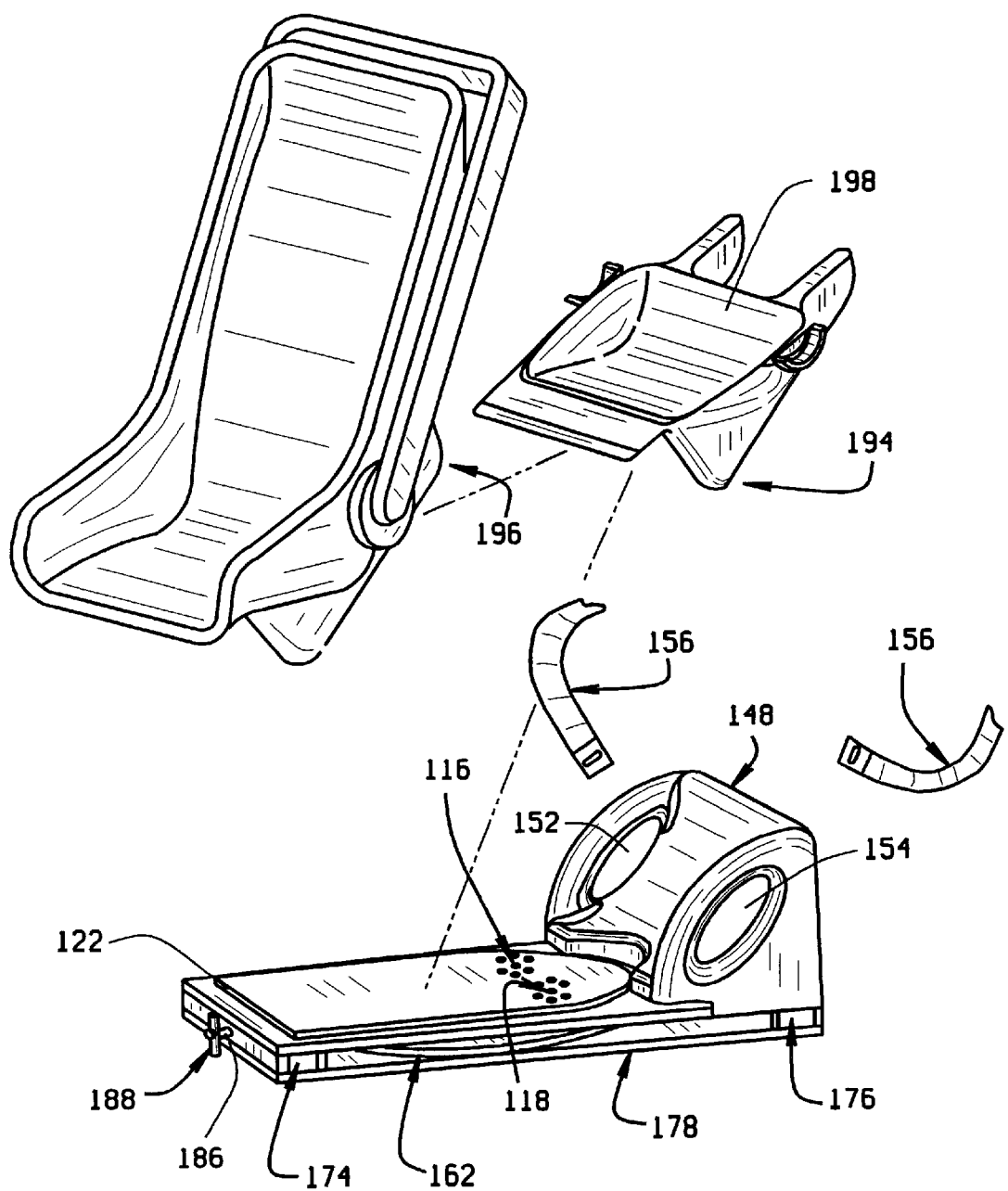
FIG. 5 is a partially exploded side view of the car seat assembly shown in FIG. 4.

FIG. 5 is a partially exploded side view of car seat assembly 110. Pivot member 114 is attached to attachment disk 162 with pins 116 and 118. Attachment disk 162 is positioned between support member 112 and base 178 such that attachment disk 162 can rotate with respect to support member 112 and base 178. A first air gap extends between attachment disk 162 and support member 112 and a second air gap extends between attachment disk 162 and base 178. The spacing of attachment disk 178 between support member 112 and base 178 is maintained by first spacer 174 and second spacer 176 since a thickness of first spacer 174 and second spacer 176 is greater than a thickness of attachment disk 178. In one embodiment, the thickness of first spacer 174 and second spacer 176 is identical. In an alternative embodiment, the thickness of first spacer 174 is greater or less than the thickness of second spacer 176.

Pins 116 and 118 extend through slots 142 and 144 such that pivot member 114 can pivot, or rotate with respect to support member 112. In one embodiment, pivot member 114 can pivot about 180 degrees with respect to support member 112, i.e., such that front side 122 can be substantially parallel to either support member first side 134 or support member second side 136.

In use, car seat assembly 110 is positioned in an automobile (not shown) and seat belt 56 is fastened through retaining portion 148. Pin 186 is then pulled out of locking tab opening 172 until flange 190 contacts first spacer 174. Pivot member 114 along with seat member 196 is then pivoted towards first side 134 of support member 112. In an alternative embodiment, pivot member 114 along with seat member 196 is pivoted towards second side 134 of support member 112. A child (not shown) is then fastened within seat member 196 as is well known in the art. After the child is secured within seat member 196, pivot member 114 and seat member 196 are pivoted such that pivot member front side 122 is aligned with support member front 138. Then, pin 186 is positioned adjacent locking tab opening 172 and spring 191 forces pin 186 within opening 172 to prevent pivot member 114 and seat member 196 from pivoting with respect to base 178.

The car seat assembly provides a car seat that swivels with respect to the support member and base which are securely fastened to the automobile. The swiveling seat allows a child to be secured within the seat without the strain that is sometimes associated with placing a child in known car seat assemblies.

While the invention has been described in terms of various specific embodiments, those skilled in the art will recognize that the invention can be practiced with modification within the spirit and scope of the claims.

What is claimed is:

1. An infant car seat assembly comprising:
   a support member including a first curved slot and a second curved slot, said first curved slot intersecting said second curved slot, said support member further including at least one seat belt receiving portion comprising an opening therethrough;
   a pivot member including a first pin and a second pin, said first pin positioned within said first slot, said second pin positioned within said second slot; and
   a seat member connected to said pivot member.

2. An assembly in accordance with claim 1 further comprising a seat holder connected to said pivot member and said seat member.

3. An assembly in accordance with claim 2 wherein said seat holder is rigidly connected to said pivot member, said seat member detachably connected to said seat holder, such that said seat member can be detached from said support member.

4. An assembly in accordance with claim 1 wherein said seat member is detachably connected to said pivot member.

5. An assembly in accordance with claim 1 further comprising an attachment disk, said first and second pins fixedly connected to said attachment disk.

6. An assembly in accordance with claim 1 further comprising a first spacer, a second spacer, and a base, said spacers fixedly connected to said base and said support member.

7. An assembly in accordance with claim 6 further comprising a pin and an attachment disk comprising a locking tab including an opening extending at least partially therethrough, said first spacer comprising an opening extending therethrough, said pin extending through said first spacer opening and said locking tab opening.

8. An assembly in accordance with claim 1 wherein said seat member is rigidly connected to said pivot member.

9. An infant car seat assembly comprising:

a support member including a first slot and a second slot, said first slot intersecting said second slot;

a pivot member including a first pin and a second pin, said first pin positioned within said support member first slot, said second pin positioned within said support member second slot;

a seat member connected to said pivot member such that said seat member pivots in relation to said support member; and a seat holder connected to said pivot member and said seat member, said seat holder positioned between said pivot member and said seat member said seat holder rigidly connected to said pivot member, said seat member detachably connected to said seat holder, such that said seat member can be detached from said support member.

10. An assembly in accordance with claim 9 wherein said seat member is detachably connected to said pivot member.

11. An assembly in accordance with claim 9 wherein said support member comprises at least one seat belt receiving portion comprising an opening therethrough.

12. An assembly in accordance with claim 11 wherein said at least one seat belt receiving portion comprises a first seat belt retaining portion extending from a first side of said support member and a second seat belt retaining portion extending from a second side of said support member.

13. An assembly in accordance with claim 9 further comprising an attachment disk, said first and second pins fixedly connected to said attachment disk, such that said seat member and said attachment disk pivot in relation to said support member.

14. An assembly in accordance with claim 13 wherein said attachment disk configured to pivot about 180 degrees with respect to said support member.

15. An assembly in accordance with claim 9 further comprising a first spacer, a second spacer, and a base, said spacers fixedly connected to, and extending between, said base and said support member.

16. An assembly in accordance with claim 15 further comprising an attachment disk comprising a locking tab including an opening extending at least partially therethrough, said first spacer comprising an opening extending therethrough.

17. An assembly in accordance with claim 16 further comprising a pin extending through said first spacer opening and said locking tab opening, said pin for fixing said pivot member to said support member such that said pivot member cannot pivot with respect to said support member.

* * * * *